June 13, 1939.   A. J. PIERPOINT ET AL   2,161,933
ELECTRICAL TREATMENT OF WATER FOR THE PURPOSE OF REDUCING HARDNESS
Filed Oct. 14, 1935

INVENTORS
Albert John Pierpoint &
Reginald Henry Crauch.
By Franks Appleman, ATTORNEY Patented June 13, 1939

2,161,933

UNITED STATES PATENT OFFICE 2,161,933

ELECTRICAL TREATMENT OF WATER FOR THE PURPOSE OF REDUCING HARDNESS

Albert John Pierpoint and Reginald Henry Crouch, London, England

Application October 14, 1935, Serial No. 44,989
In Great Britain October 15, 1934

6 Claims. (Cl. 204—25)

Applications have been filed for patent in Great Britain, No. 29,508 filed October 15, 1934, and No. 35,266 filed December 7, 1934.

This invention relates to apparatus for the treatment of liquids by passing an electric current therethrough and particularly for the treatment of water in order to reduce the hardness or the effects thereof.

The hardness in water is commonly removed by a chemical process which serves to withdraw the particular impurities to which the hardness is due, the water resulting from such treatment being generally described as tasting "flat". We have found, however, that by discharging electric alternating current of a particular value through the water to be treated, it is possible to improve its qualities, not by the removal of those impurities causing hardness, but by the modification of the physical properties in such a way that the well known results of hardness in water no longer have a deleterious effect. Thus, water which has been treated in this way may be evaporated, the residues being in the form then of a mud instead of a hard scale as would normally be the case.

In short, the constituents causing hardness are not removed, but merely a change in physical properties is brought about.

We have further found that in order for the treatment to be consistently successful, it is necessary to ensure that all the water to be treated shall pass in close proximity to the electrode or electrodes from which the current is discharged, and one object of the invention is to provide an apparatus which will enable this to be done.

A further object is to provide an electrode element for such an apparatus which will enable the water to be passed in close proximity to the electrode for treatment.

Suitable current values for the treatment of water range between 0.01 and 0.49 milliampere, with the electrical pressure between the two electrodes ranging between 0.1 and 0.7 volt.

For the better understanding of the invention, reference will now be made to the accompanying drawing illustrating various examples of construction in which.

Figure 1:
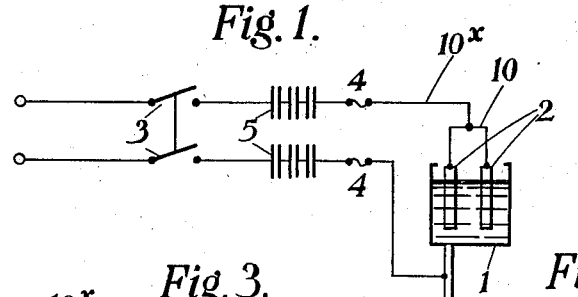
Fig. 1 is a diagrammatic view illustrating a typical circuit arrangement embodying features of the invention.

As already mentioned, the process of treating water consists in discharging an electric alternating current of a selected value through the mass of water to be treated and the arrangement adopted for the purpose is diagrammatically illustrated in Fig. 1, in which 1 is a metal tank containing the water to be treated, and 2 are electrode elements of the form more fully described below. In order to obtain the required discharge the tank 1 is connected to one side of a source of alternating current and the electrodes are connected to the other side as shown through the circuit breakers 3 and fuses 4. Further, as it is also necessary to be able to adjust the value of the discharge to suit the particular conditions, variable condenser units 5 are incorporated in the circuit. The return half of the circuit as shown is not essential to the operation of the apparatus, since an earth return would serve the same purpose, but a direct return is sometimes required by the public authority concerned. It will be understood that the tank 1 merely serves as an electrode and can take any other suitable form, e. g., it may be afforded by part of a pipe line, or by an element serving merely as an electrode.

Figure 2:
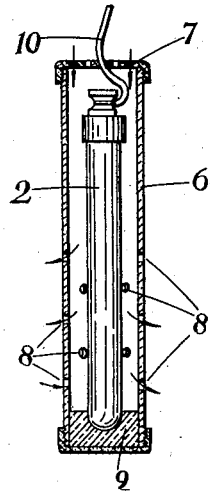
Fig. 2 is a sectional elevation showing the preferred construction of electrode element designed more particularly for use with water.

In order to ensure most efficient treatment it is necessary to bring the water being treated into as intimate a contact as possible with the electrode and for this purpose an electrode element such as that illustrated in Fig. 2 may be employed, comprising a cylindrical body 6 having a perforated upper closure cap 7 and a closed lower end. The walls of the element are pierced at their lower ends by a number of holes at 8 so that water entering by the cap may flow out again. In the bottom of the hollow element 6 an insulating support 9 is fitted which serves to receive one end of a carbon or metal electrode 2 and maintain the latter in an upright position coaxial with the element body 6. The electrode 2 extends almost to the top of its containing element and is at its upper end provided with a lead 10 by which it can be connected to the source of current. This form of electrode element is especially suitable where the water is treated as it is supplied to a cistern as in a domestic or general water supply system. In this case the required number of electrode elements is preferably arranged to constitute an outlet from a small container into which the water to be treated is supplied from the mains, the electrode elements themselves discharging into the cistern. Thus, in the example shown in Fig. 3 a rectangular receptacle 11 constituting such small container is suspended in the usual cistern 1 under the water inlet with its base just below the normal water level of the cistern 1 as shown. The top of the receptacle 11 is left open and the water which would normally enter the cistern 1 is thus fed into the receptacle 11. The bottom of the latter is provided with a number of apertures, each aperture having secured in it one of the electrode elements illustrated in Fig. 2 the leads 10 from which are connected to a common lead 10x and then through a circuit such as is illustrated in Fig. 1 to the source of current.

The number of elements 6 arranged in the lower side of a receptacle 11 will depend entirely upon the volume of water flowing therethrough. A four-electrode unit having an effective electrode surface area of about 48 square inches or 12 square inches per electrode is adequate for the treatment of 20 gallons of water per hour passing through the receptacle for domestic uses, or 70 gallons per hour for de-scaling only.

Figure 4:
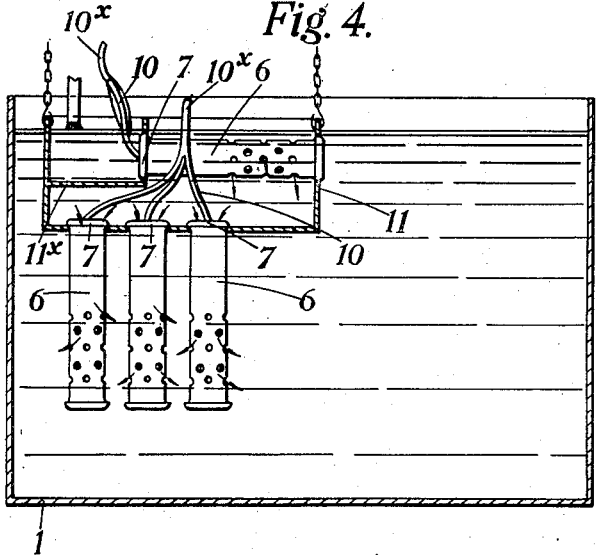
Fig. 4 is a similar view to Fig. 3 but shows a modified form of apparatus.

Generally speaking, in order to determine the requisite number of electrode elements when treating water, it may be assumed that the rate of flow should not exceed 0.13 gallon per electrode per minute for scale prevention for an electrode having a total surface area of 12 square inches, or 0.1 gallon per electrode per minute for domestic purposes. Slower rates than these may, of course, be used with advantage.

Where greater efficiency is required the flow of water may be caused to take place through two electrode stages as illustrated in Fig. 4, in which the receptacle 11 is enlarged and a receptacle 11x is arranged within it at one end. A set of electrode elements 6 is arranged to project horizontally from the wall of the receptacle 11x and these elements are supported at their other ends in the wall of the receptacle 11. The water to be treated is supplied to the receptacle 11x and thus has to pass the two sets of electrodes 6 before reaching the main tank 1.

The location of the receptacle 11 is, as referred to above, such that the bottom is below the normal water level in the cistern 1 and thus all the elements 6 are immersed in the water contained in the cistern. It should be understood that the total immersion of the elements 6 is not essential but it has been found that the best results have been obtained in this way. Further, it is not essential for the elements 6 to project downwardly, even where only one set is employed; the horizontal arrangement of Fig. 4 could be used alone.

The electrode element illustrated in Fig. 2 could even be incorporated in a pipe line if required.

The common wire 10x is connected to the source of current through a fuse 4 rated at 60 milliamperes, and through a variable condenser unit 5 and also through a circuit breaker 3 to one side of the mains, as shown in Fig. 1. The other side of the mains is connected to the cistern 1 in which the treated water is contained. It is not important whether the mains afford a supply of direct current or alternating current, since by adjusting the value of the variable condenser unit 5 an alternating current of very small proportions, for instance, between 0.01 and 0.49 milliampere can be obtained. It is possible to obtain this small alternating current from direct current sources, since it has been found that commercial direct current has a sufficient component of alternating current to suffice for the treatment. As the condenser unit 5 is arranged in series with the electrodes 2, the passage of direct currents is effectively prevented.

Preferably, the condenser unit variation is obtained by the use of individual strip condensers of small value. With the aid of an arrangement of two short-bus bars the value of the condenser unit formed by connection of the strip condenser elements across the bus-bars may be changed at will, either by adding a further strip condenser or removing one. In this way, when the desired capacity has been reached there is no fear of the capacity being accidentally changed.

The value of the current required is found to vary in every installation within the limits referred to and in view of the delicacy of adjustment required it is preferable, where a large number of elements 6 are employed, to group them under the control of individual circuits.

Figure 3:
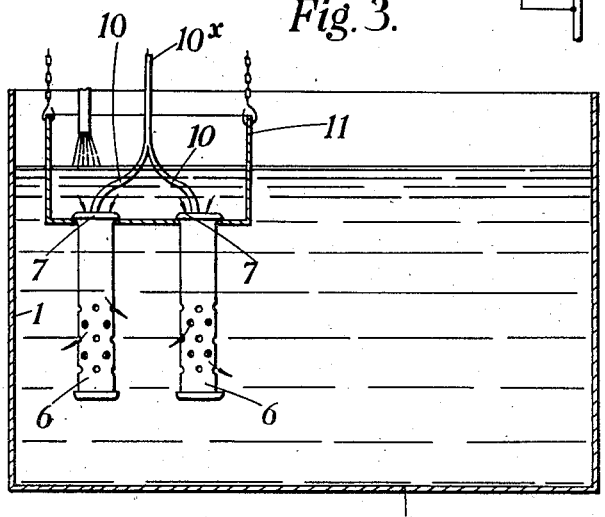
Fig. 3 is a semi-diagrammatic elevation showing a simple arrangement of a plurality of electrode elements more particularly for the treatment of water.

In operation, the circuit breaker 3 on the control panel is closed and an alternating current within the range already referred to is allowed to discharge from the electrodes 2 to the cistern 1 (Figs. 3 and 4). By adjusting the capacity of the series condenser 5 the total current flowing through the body of water may be adjusted to a particular value. It is this total current which must be carefully kept within the limits specified.

The receptacles 11, 11x are preferably constructed of teak, glass or the material known under the registered trade-mark "Bakelite". The part 6 of the element shown in Fig. 2 is preferably made in "Bakelite" in order that any corrosion likely to take place is reduced to a minimum.

It is clear that where a large quantity of water is to flow through a receptacle the stream might be too great to be properly dealt with by a single one. In this case the invention contemplates the provision of a header adapted to break the stream into a number of separate and independent streams, each of which could be arranged to discharge into a separate receptacle with the requisite number of electrode elements mounted therein.

It will be apparent that the invention has particular value from its commercial aspect since when boiler feed water is treated the normal hard scale forming upon the boiler tubes and the internal working parts of the boiler would be eliminated. Instead of this hard scale a readily-removable soft mud would be the only result.

We claim:

1. In apparatus for the electrical treatment of water, an electrode element comprising a cylindrical body having perforations for the outlet of water, a closing upper cap therefor having perforations for the inlet of water, an electrode in the cylindrical body, means in the cylindrical body for supporting the electrode to prevent displacement thereof, a conductor projecting through said cap for connecting the electrode to a current supply, means for supplying water through the perforations in said closing cap, a second electrode separate from said electrode element with which the water is in contact, and a conductor connecting said second electrode to a current supply.

2. In apparatus for the electrical treatment of water, an electrode element comprising a cylindrical body having perforations for the outlet of water to be treated, a closing upper cap therefor having perforations for the inlet of water, an electrode in the cylindrical body, means in the cylindrical body for supporting the electrode to prevent displacement thereof, a conductor projecting through said cap for connecting the electrode to a current supply, means for supplying water through the perforations in said closing upper cap, a conductive container for the water, electrically separate from said electrode element, in which said element is arranged, and a conductor connecting said container to a current supply.

3. In apparatus for the electrical treatment of water, an electrode element in the water comprising a hollow casing of insulating material having inlet and outlet apertures, an electrode enclosed in said casing, means in the casing for supporting the electrode to prevent displacement thereof, a conductor projecting through said casing connecting the electrode to a current supply, means for supplying water to the inlet to said casing, a second electrode separate from said electrode element with which the water is in contact, and a conductor connecting said second electrode to a current supply.

4. In apparatus for the electrical treatment of water, an electrode element comprising a hollow casing of insulating material having inlet and outlet apertures for the water to be treated, an electrode enclosed in said casing, means in the casing for supporting the electrode to prevent displacement thereof, a conductor projecting through said casing connecting the electrode to a current supply, means for supplying water to the inlet to said casing, a conductive container with which the water is in contact, electrically separate from said electrode element, in which said element is arranged, and a conductor connecting said container to a current supply.

5. Apparatus for the electrical treatment of water, comprising a metal container for water, at least one electrode element arranged therein to be immersed in the water, said element comprising an electrode, a hollow casing of insulating material enclosing said electrode, means in the casing for supporting the electrode against displacement, said casing having an inlet at one end connected to a supply of water and an outlet for the discharge of water to the container, and conductors connecting the electrode and container respectively to a current supply.

6. Apparatus for the electrical treatment of water, comprising a metal container for water, a receptacle in the container partially submerged therein, a supplemental receptacle within the first mentioned receptacle, an electrode element having one end anchored in the wall of the supplemental receptacle and extending into said receptacle and another electrode element anchored in the wall of said receptacle and extending into the container, each of said electrode elements comprising an electrode, a hollow casing of insulating material having an inlet and outlet and enclosing said electrode, means in the casing for supporting the electrode against displacement and being anchored to their respective receptacles with their inlets in communication with the interiors thereof, and conductors connecting the electrodes and container respectively to a current supply.

ALBERT JOHN PIERPOINT.
REGINALD HENRY CROUCH.